(12) United States Patent
Broyer et al.

(10) Patent No.: US 7,159,618 B2
(45) Date of Patent: Jan. 9, 2007

(54) ELECTRICALLY OPENED MICRO FLUID VALVE

(75) Inventors: Patrick Broyer, Beynost (FR); Bruno Colin, Marcy l'Etoile (FR); Denis Roller, La Ferte Alais (FR)

(73) Assignees: Biomerieux, Marcy L'Etoile (FR); SNPE Matériaux Energétiques, Paris (FR)

( * ) Notice: Subject to any disclaimer, the term of this patent is extended or adjusted under 35 U.S.C. 154(b) by 0 days.

(21) Appl. No.: 10/559,454

(22) PCT Filed: Jun. 15, 2004

(86) PCT No.: PCT/FR2004/050223

§ 371 (c)(1),
(2), (4) Date: Dec. 5, 2005

(87) PCT Pub. No.: WO2004/113735

PCT Pub. Date: Dec. 29, 2004

(65) Prior Publication Data

US 2006/0180223 A1    Aug. 17, 2006

(30) Foreign Application Priority Data

Jun. 16, 2003    (FR)  ................................. 03 077222

(51) Int. Cl.
*F15C 1/04*    (2006.01)
*F15C 1/06*    (2006.01)

(52) U.S. Cl. ...................... 137/828; 137/807; 137/833; 251/368; 422/100

(58) Field of Classification Search ................ 137/828, 137/833, 807; 251/368; 422/100
See application file for complete search history.

(56) References Cited

U.S. PATENT DOCUMENTS

| 1,755,023 | A |   | 4/1930 | Rühlemann |
|-----------|---|---|--------|-----------|
| 1,791,606 | A |   | 2/1931 | Rühlemann |
| 1,858,969 | A |   | 5/1932 | Rühlemann |
| 3,518,943 | A |   | 7/1970 | Meers et al. |
| 3,721,255 | A | * | 3/1973 | Suzuki et al. ................ 137/807 |
| 3,820,461 | A |   | 6/1974 | Silvia |

(Continued)

FOREIGN PATENT DOCUMENTS

GB            273 338         12/1927

(Continued)

*Primary Examiner*—A. Michael Chambers
(74) *Attorney, Agent, or Firm*—Oliff & Berridge, PLC (57) ABSTRACT

The invention relates to an electrically-opened micro fluid-valve. The inventive valve comprises: at least one planar support (12); at least one afferent microchannel (14); at least one efferent microchannel (16), said microchannels being arranged in the support (12); such that at least one of the ends (141 and 161) thereof touch the inner face (121) of the support close to one another; at least one deposit (18) of a heat-sensitive material which is disposed on the inner face (121) of the support (12); and at least one heating means (20). According to the invention, the aforementioned deposit (18) of heat-sensitive material at least partially seals the space separating the ends (141 and 161) of the microchannels (14 and 16), thereby preventing same from intercommunicating. When the temperature of the above-mentioned heating means (20) is raised, the structure of the heat-sensitive material is altered, thereby at least partially opening the ends of the microchannels an the space therebetween, in order to enable communication between said microchannels and to restore the flow of the fluid.

22 Claims, 6 Drawing Sheets

U.S. PATENT DOCUMENTS

| | | | |
|---|---|---|---|
| 5,133,386 A * | 7/1992 | Magee | 137/625.65 |
| 5,346,372 A | 9/1994 | Naruse et al. | |
| 6,048,734 A | 4/2000 | Burns et al. | |
| 6,130,098 A | 10/2000 | Handique et al. | |
| 6,382,254 B1 | 5/2002 | Yang et al. | |
| 6,453,928 B1 * | 9/2002 | Kaplan et al. | 137/14 |
| 6,622,746 B1 * | 9/2003 | Yang et al. | 137/4 |
| 6,679,279 B1 | 1/2004 | Liu et al. | |
| 6,752,966 B1 | 6/2004 | Chazan | |
| 2002/0195579 A1 | 12/2002 | Johnson | |
| 2003/0106596 A1 * | 6/2003 | Yang et al. | 137/828 |
| 2004/0007275 A1 | 1/2004 | Liu et al. | |
| 2004/0144242 A1 | 7/2004 | Perut et al. | |

FOREIGN PATENT DOCUMENTS

| | | |
|---|---|---|
| GB | 951620 | 3/1964 |
| GB | 1 252 984 | 11/1971 |
| WO | WO 98/22719 A1 | 5/1998 |
| WO | WO 98/22738 A1 | 5/1998 |
| WO | WO 99/01688 A1 | 1/1999 |
| WO | WO 01/02737 A1 | 1/2001 |
| WO | WO 01/17797 A1 | 3/2001 |
| WO | WO 02/065005 A1 | 8/2002 |
| WO | WO 02/088551 A1 | 11/2002 |

* cited by examiner

ELECTRICALLY OPENED MICRO FLUID VALVE

The technical field of the present invention is that of microvalves. More particularly, the present invention relates to an electrically openable microfluidic valve designed to be used in Microsystems.

Microvalves are microactuators increasingly used within microfluidic circuits in Microsystems, for various applications, and especially biomedical applications, such as for example in analysis cards, but also in the field of chemical synthesis using microreactors.

In the biomedical field, various types of microvalve have been described. A first type relates to microvalves using a pyrotechnic effect. Such a valve has been described for example in document WO-A-98/22719. This is a miniature valve for filling the reservoir of a transdermal administration device. The principle of operation of this valve is based on the fragmentation of a substrate brought about by the combustion gases of a pyrotechnic charge, said substrate initially separating a reserve of fluid from an empty reservoir. This microvalve may, according to another embodiment, be used with an inflatable envelope. The combustion gases firstly rupture the substrate and then inflate the envelope for the purpose of pushing on a fluid so as to expel it.

These microvalves have as main drawback the emission of substrate fragments into the microcircuit.

Document WO-A-98/22738 discloses an intravenous injection device comprising a second type of microvalve. These microvalves are placed, along a linear circuit for delivering perfusion liquids, in a casing and essentially comprise a seat and a closure element of the valve, made in a thermoplastic material, which melts on contact with an electrical heating element so as to open or close the valve.

Although such valves are suitable for the injection device disclosed in this document, they have major drawbacks that prevent them from being applied to a planar device of the microsystem type in which the fluidic circuit is placed in a confined space. This is because, in the microvalve disclosed in document WO-A-98/22738, the closure element is positioned perpendicular to the direction of the flow. Thus, in the case of a valve at opening, when this element is heated, it divides into two lips that pivot so as to be in the direction of the flow, which is in no way impeded. In a microsystem in which the microvalves are placed in the "U"-shaped zone parallel to the direction of the flow, such a valve would greatly impede the flow.

Another drawback stems from the fact that valves having such a structure are subject to liquid retention after they have been opened. This therefore results in the presence of a not insignificant dead volume, which constitutes a major drawback in a microsystem-type application. This is because, since the volume of liquid flowing in such a device is firstly very small, the presence of an excessively large dead volume impairs proper operation of this device.

Document WO-A-02/065005 discloses a multilayer microdevice using a bimetallic strip and an elastomer material of the PDMS (polydimethylsiloxane) type in which a channel is open. When a voltage is applied to the bimetallic strip, it deforms and flattens the flexible walls of the channel, thus occluding it.

The major drawback of this device lies in the constructional complexity (large number of layers) and the need to have a not insignificant temperature rise in the bimetallic strip in order to close the channel. Moreover, the level of sealability over time must also be quite low.

It also turns out that PDMS is not a material very suitable for the flow of a liquid in Microsystems for biological applications. This is because its highly hydrophobic character leads to the possibility of bubbles forming in the microfluidic circuit. It is difficult to process (cast) and it has a high adsorptivity for proteins.

Document U.S. Pat. No. B-6,382,254 discloses a microfluidic valve for controlling the flow of a liquid through a channel. The operation of the valve is based on the use of a liquid (of the polyethylene oxide type) whose viscosity greatly increases with temperature (the liquid passes into the gel state).

This device has the drawback of having to mix the transported liquid with the activator liquid (compatibility problem, difficult processing) and of having to integrate a liquid into a confined space in the microdevice (if the activator liquid is not mixed with the transported liquid) and therefore filling problems that result therefrom. This device also has the major drawback of having to heat the liquid and/or the device up to 50° C., which is not very compatible with biological reactions at controlled temperatures and possibly with reactants cannot withstand such temperature rises, especially enzymes.

It follows from this review of the prior art that no electrically openable microfluidic valves exist that are suitable for being operated in a confined space, in particular in a microsystem, which can be easily produced on an industrial scale and integrated into the microsystem fabrication process, the operation of which valve is compatible with biological reactions, which provides good sealing when it is in the closed state and which, once in the opened state, does not constitute an obstacle to the flow of fluid, and the dead volume of which, lost in the valve, is negligible compared with the volumes transported in the microsystem.

A first object of the present invention is therefore to provide a microfluidic valve that can be opened in a confined space, in particular in a microsystem.

A second object of the present invention is to provide a microfluidic valve that must be easily produced using an industrial microsystem production process.

A third object of the present invention is to provide a microfluidic valve that also has to be very reliable, especially by ensuring that the valve seals well in the closed state and there is good flow of the liquid in the open state, by avoiding any impediment to the flow.

A fourth object of the present invention is to provide a microfluidic valve having an architecture such that it is easily possible to place several microfluidic valves, in series or in parallel, in a microcircuit within a microsystem.

Lastly, a final object of the present invention is to provide a microfluidic valve with low manufacturing cost.

These objects, among others, are achieved by the present invention which relates to an electrically openable microfluidic valve, which comprises:

at least one plane support;
at least one afferent microchannel;
at least one efferent microchannel;

said microchannels being provided in the support, so that at least one of their ends opens onto the internal face of said support, near one another;

at least one deposit of a heat-sensitive material laid out on the internal face of the support; and at least one heating means; so that the deposit of heat-sensitive material at least partly closes off the space separating the ends of the microchannels and, thus preventing the latter from communicating with one another;

the increase in temperature by the heating means resulting in a modification of the structure of the heat-sensitive material, thus at least partially clearing the ends of the microchannels and the space between the latter, so as to allow communication between said microchannels and to restore flow of the fluid.

Preferably, the microfluidic valve according to the invention further includes at least one coating layer bonded to the support.

According to a first embodiment of the microfluidic valve, the heat-sensitive material is a thermofusible material.

In particular, this thermofusible material may be a polymer material. As a second embodiment, this thermofusible material may also be a thermofusible or hot-melt adhesive.

In a third embodiment of the microfluidic valve according to the invention, the heat-sensitive material is a heat-expandable material.

In a fourth embodiment of the microfluidic valve according to the invention, the heat-sensitive material is a heat-shrinkable material. The term "heat-shrinkable material" is understood to mean materials that have the property of shrinking or contracting when they are placed near a heat source.

In particular, the heat-shrinkable material is taken from the group comprising thermoplastic elastomers such as block copolymers of PE and PB (polybutadiene) or PI; and irradiated PEs.

In a fifth embodiment of the microfluidic valve according to the invention, the heat-sensitive material is a pyrotechnic composition.

In particular, the pyrotechnic composition is a nitrocellulose-based composition.

According to another remarkable characteristic, the heating means comprises at least one conducting track, having conducting zones, and at least one preferential heating zone, optionally at least partly in contact with the deposit of heat-sensitive material.

Advantageously, the increase in temperature of the preferential heating zone is obtained by applying an electric current to the conducting track.

The preferential heating zone is formed by a deposit of a resistive material.

As a variant, the preferential heating zone may also be a heating zone of restricted cross section of the conducting track.

Advantageously, the heat-expandable material is deposited in a well made on the internal face of the support.

In another advantageous variant of the invention, the coating layer includes a recess lying in the extension of the ends of the microchannels.

Preferably, the microfluidic valve according to the invention further includes a gas evacuation means. Advantageously, this means is a vent.

Another subject of the invention is a process for fabricating a microfluidic valve, which comprises the following steps:

a) the fabrication of the plane support, which includes at least one afferent microchannel and at least one efferent microchannel;

b) the deposition of the heat-sensitive material by bonding a film to the internal face of the support so as to close off the ends of said microchannels; and c) the deposition of at least one conducting track, which includes at least one preferential heating zone at least partly on said layer of heat-sensitive material, it being possible for steps b) and c) to be reversed.

Preferably, the process according to the invention further includes a step of depositing a coating layer by bonding a film to the plane support.

Very advantageously, the films constituting the layer of heat-sensitive material and the coating layer are bonded to the plane support by hot or cold lamination, or by bonding using a hot-melt adhesive.

According to another advantageous feature, the conducting track is deposited:

by photoetching of the conducting zones then screenprinting or pressure-pad printing of the preferential heating zone; or by photolithography of the conducting zones and of the preferential heating zone.

Another subject of the invention is a microsystem that comprises at least one microfluidic valve.

Another object of the invention is a method of opening a microfluidic valve as described above, which comprises the following steps:

the application of an electric current in at least one conducting track having a preferential heating zone;

the increase in the temperature of the preferential heating zone;

the modification of the structure of the heat-sensitive material in contact with the preferential heating zone;

the at least partial clearing of the ends of the microchannels and of the space between the latter, so as to establish communication between said microchannels; and the restoration of the fluid flow.

The present invention will be more clearly understood in the light of the detailed description that follows, with reference to the drawings in which.

Figure 1A:
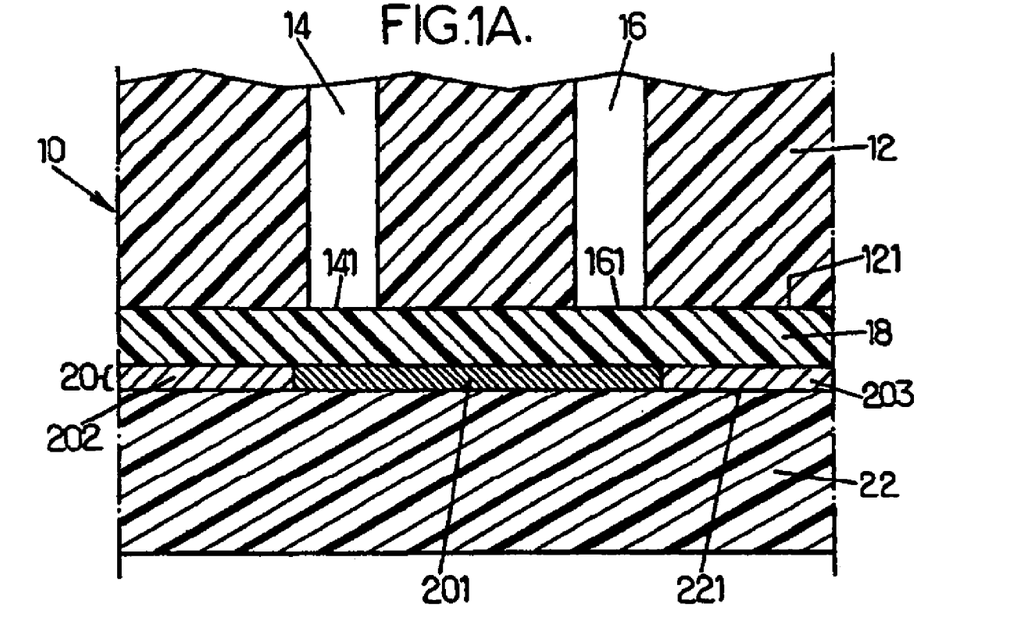
FIGS. 1A, 1B and 1C show longitudinal axial sectional views of a microfluidic valve according to a first embodiment, in the closed position and open position respectively, in which the heat-sensitive material is a thermoplastic polymer.

As may be seen in FIG. 1A, the microfluidic valve 10 according to the invention has a multilayer laminar structure. A first layer constitutes the plane support 12. Advantageously, this support may be made of polycarbonate (PC), polypropylene (PP), polystyrene (PS), acrylonitryl-butadiene-styrene (ABS), cyclic cycloolefins (COC), polyetheretherketone (PEEK), polymethyl methacrylate (PMMA) or any polymer support compatible with the melting point of the heat-sensitive material. The thickness of this support is advantageously between 0.2 and 3 mm. Provided in this support, which is made of polycarbonate, are an afferent microchannel 14, which delivers the fluid to the microfluidic valve, and an efferent microchannel 16 which receives the fluid once the valve has opened, the microchannels 14 and 16 forming part of a microfluidic circuit. These microchannels have a preferably circular cross section of diameter between 0.01 and 3 mm. The ends 141 and 161, of the microchannels 14 and 16 respectively, run into the internal surface 121 of the support 12.

The support 12 and the microchannels 14 and 16 are preferably obtained by a conventional injection molding process. However, any equivalent process, such as microreplication ("hot embossing" and microinjection molding) or laser etching/drilling/cutting processes may also be used.

The support 12 is in contact with a layer 18 of a heat-sensitive material. This heat-sensitive material is in this case a thermoplastic material taken from the group comprising PP, PET, PEN (polyethylene naphthalate) in the form of a monolayer or multilayer film of the PP/PET type bonded to the support 12. This film may be bonded either by lamination without an adhesive (thermocompression bonding) or it may be bonded by hot-melt lamination, that is to say with one face coated with a hot-melt adhesive. One face of the film or the face 121 of the support may also be coated with a photoactivatable, UV-curable or pressure-sensitive adhesive of the silicone type. Finally, the film may be bonded by the high-frequency, ultrasonic, vibration or laser welding, by contouring or by using a mask, of the ends 141 and 161 of the microchannels 14 and 16.

It follows from this structure that the microchannels 14 and 16 are closed off by the layer 18 and therefore do not communicate with each other. The thickness of the layer 18 is between 0.005 and 0.3 mm.

A conducting track 20 is deposited beneath said layer 18. This track includes a preferential heating zone 201 bounded by two conducting zones 202 and 203. The preferential heating zone 201 lies vertically below the zone formed by the ends 141 and 161 of the microchannels 14 and 16 and the space separating the ends. This zone 201 may either by a resistive track or a zone in which the track cross section is restricted, in such a way that when a current is delivered into the conducting track the temperature in the zone 201 greatly increases. The conducting track 20 is preferably based on copper or aluminum. It may also be a carbon-based conductive ink. When the heating zone 201 is a resistive zone, the latter is preferably obtained by depositing a resistive ink, having a resistance of the order of 100 ohms. Such an ink may, for example, be the ink Carbon Conductive Ink SD 2841 HAL-IR, sold by Peters.

This conducting track is produced by photoetching the conducting zones 202 and 203 and then screenprinting or pressure-pad printing the preferential heating zone 201. In an alternative method, this conducting track may be entirely produced by photolithography.

Finally, the microfluidic valve includes a layer 22, also made of a polymer material, of the polystyrene (PS), polyimide (PI), PC, PET, PE, PMMA, PEEK or COC types, PC and PE being preferred. The conducting track 20 is produced on the internal face 221 of the layer 22, by screenprinting, pressure-pad printing, photolithography, photoetching or any other process for producing conducting tracks on a polymer film or substrate. The thickness of the layer 22 is preferably between 0.2 and 2 mm. The layer 18 is attached to the layer 22 by any suitable means, and especially by adhesive bonding, heat-sealing, ultrasonic or high-frequency welding, thermocompression bonding, hot-press lamination or cold-press lamination. The layer 22 may also be produced by injection overmolding onto the layer 18.

Figure 1B:
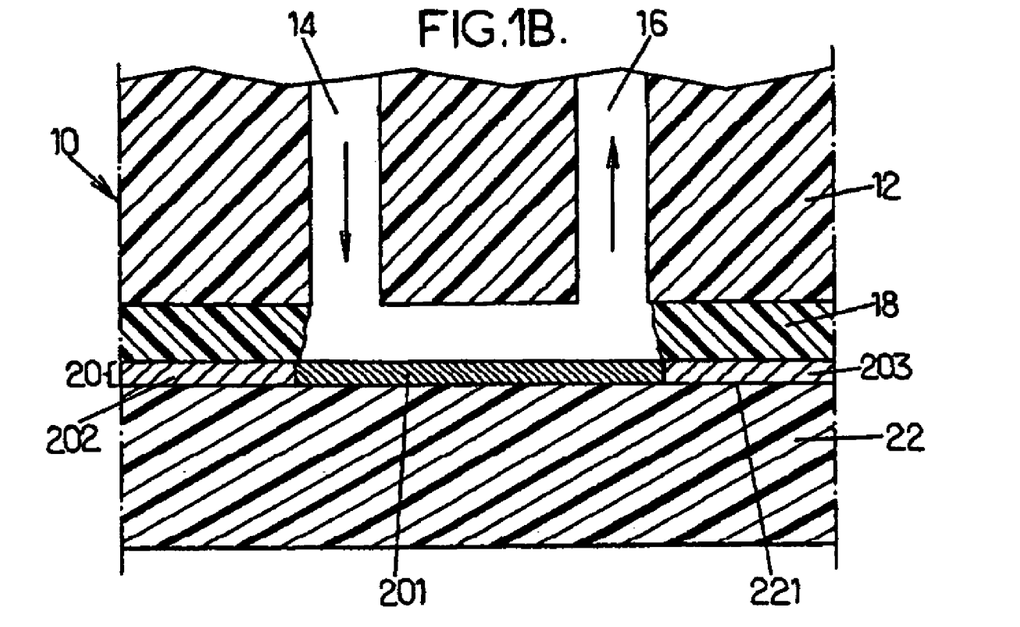

The principle of opening the microfluidic valve 10 is as follows. The conducting track 20 is connected to a current generator via any suitable means. A voltage pulse is delivered into the conducting track over a time t. This voltage may for example be 9 V or it may be between 5 and 30 V. The temperature in the heating zone 201 rises until it reaches the melting point ($T_m$) of the material constituting the layer 18. The layer 18 in the zone lying above the zone 201 melts, thereby clearing a volume bounded by the ends 141 and 161 of the microchannels 14 and 16, as shown in FIG. 1B. As a result, communication is established between the microchannels 14 and 16, thus causing the fluid to flow from the microchannel 14 into the microchannel 16, as shown by the arrows in FIG. 1B.

Figure 1C:
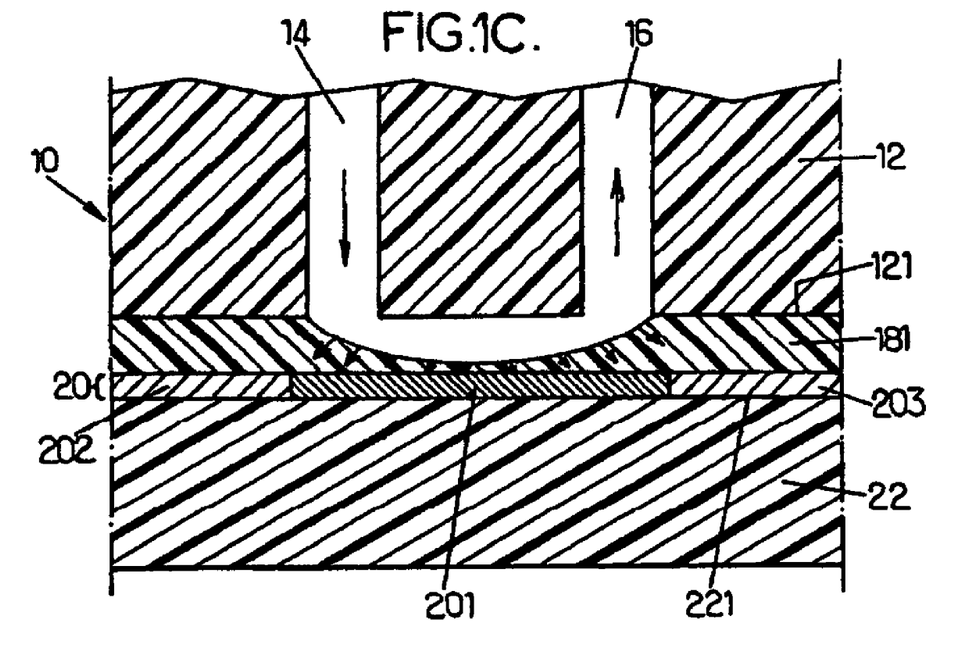

As shown in FIG. 1C, the layer 181 may also be formed from a material having a glass transition temperature ($T_g$) close to the temperature reached by the zone 201, in such a way that when the heating temperature reaches the glass transition temperature ($T_g$), the material will creep through the action of the temperature. This creep results in the layer 181 deforming, which may be characterized by it retracting along the arrows, twisting or warping. This deformation results in the debonding of the layer 101 over the entire area of contact with the zone 201, and therefore the freeing of the ends 141 and 161 of the microchannels 14 and 16 and of the space between these ends. Specifically, it suffices to obtain a gap between the layer 181 and the support 12 of between 10 and 20 μm so that communication is established between the microchannels 14 and 16 and so that the liquid can be displaced without significant head loss.

Figure 2A:
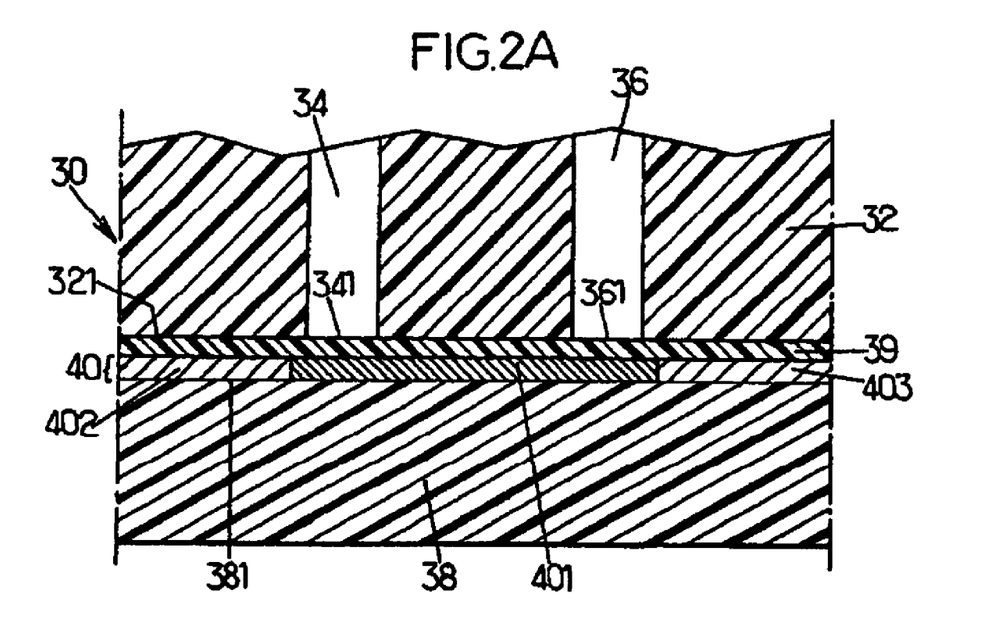
FIGS. 2A and 2B show longitudinal axial sectional views of a microfluidic valve according to a second embodiment, a variant of the first embodiment, in the closed position and open position respectively, in which the heat-sensitive material is a hot-melt adhesive.

As a variant of the first embodiment, FIG. 2A shows a second embodiment of the microfluidic valve according to the invention. The microfluidic valve 30 comprises a plane support 32, equivalent to the plane support 12, in which the afferent channel 34 and the efferent channel 36 are provided, their ends 341 and 342 being respectively flush with the internal face 321 of the support 32.

A layer 38 of polymer material, similar to the layer 22 described in the first embodiment, is bonded to the support 32 by means of a layer 39 of hot-melt adhesive, by hot lamination. This bonding may also be performed by means of a double-sided transfer adhesive tape, preferably a coreless tape, of the TESA® T256 or 7156 type or else the 3M® F 9460 PC type. In this structure therefore, the microchannels 34 and 36 are closed off by the layer 38, which seals them off by means of the layer of hot-melt adhesive.

A conducting track 40 is produced on the internal face 381 of the layer 38. As in the case of the first embodiment of the microfluidic valve according to the invention, this conducting track is produced by photoetching, followed by screenprinting or pressure-pad printing, or by lithography. As with the conducting track 20 described in the first embodiment, the conducting track 40 also includes a preferential heating zone 401, bounded by conducting zones 402 and 403, in which heating zone the temperature is higher when a current passes into the conducting track.

It follows from this structure that the microchannels 34 and 36 are closed off by the layer 39 which seals them off.

Figure 2B:
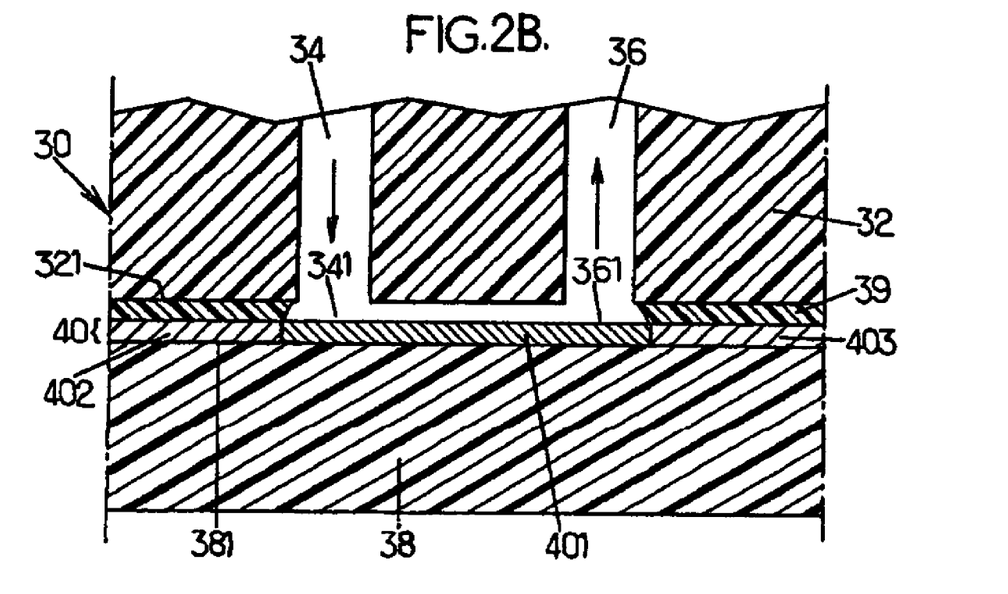

The principle of opening the microfluidic valve according to this second embodiment is as follows. A voltage is applied to the conducting track 40. The temperature in the zone 401 increases until it reaches the melting point of the adhesive constituting the layer 40 that seals off the ends 341 and 361 of the microchannels 34 and 36, and more generally that bonds the polymer layer 38 to the support 32. It follows that the hot-melt adhesive will again melt in a zone in contact with the zone 401 and creep by capillary effect, in particular in the corners of the zone that has melted. The melting of the adhesive then frees a volume between the ends 341 and 361 of the microchannels 34 and 36, allowing said microchannels to be able to communicate with each other, as shown in FIG. 2B. The liquid then flows from the microchannel 34 to the microchannel 36, along the direction of the arrows shown in FIG. 2B. The flow of fluid may be improved by the fact that the material constituting the layer 38 is softened thanks to the heat generated by the zone 401.

In the embodiment shown in FIGS. 2A and 2B, although the volume freed by melting the hot-melt adhesive is smaller than that freed by melting the polymer layer 18 in the embodiment shown in FIGS. 1A and 1B, it is however sufficient to allow the liquid, contained in the microcircuit upstream of the microfluidic valve, to flow properly.

In a first variant (not shown) of this second embodiment, the microfluidic valve according to the invention includes a layer of a polymer material bonded to the support 32 by means of the layer of adhesive 39, in a manner equivalent to the layer 18 described in the first embodiment. This layer is formed from a heat-sensitive polymer, but the melting point of which is significantly higher than that of the material used to produce the layer 18 in the first embodiment. This polymer may for example be PET, PEN, PI (Kapton®), an FR4 resin or polytetrafluoroethylene (Teflon® PTFE).

The polymer layer 38 is then bonded to the layer of polymer material by the means described above in the case of the first embodiment of the microfluidic valve according to the invention.

Advantageously, the layer 38 may include a recess on its internal face 381, provided in such a way that it lies beneath the zone 401 and is of equivalent size. Thus, the melting of the hot-melt adhesive causes the layer of polymer material to debond. Since the latter is advantageously made in a material that softens when the temperature of the zone 401 increases, it will be positioned in the recess provided in the layer 38, so that the space separating it from the support 32 is greater and thus allows better flow of fluid between the microchannels 34 and 36. In this variant, the conducting track 40 is preferably produced on the lower face of the layer of polymer material by photoetching, screenprinting, lithography or pressure-pad printing.

As a second variant of this second embodiment, which in fact constitutes a subvariant of the first variant described above, the microfluidic valve according to the invention does not include a layer 38. In this configuration, the conducting track 40 is preferably in contact with the layer 39 of conductive adhesive and is supported by the layer of polymer material added in the first variant. In other words, this layer of polymer material substitutes for the layer 38, acting as support for the conducting track 40.

Figure 3A:
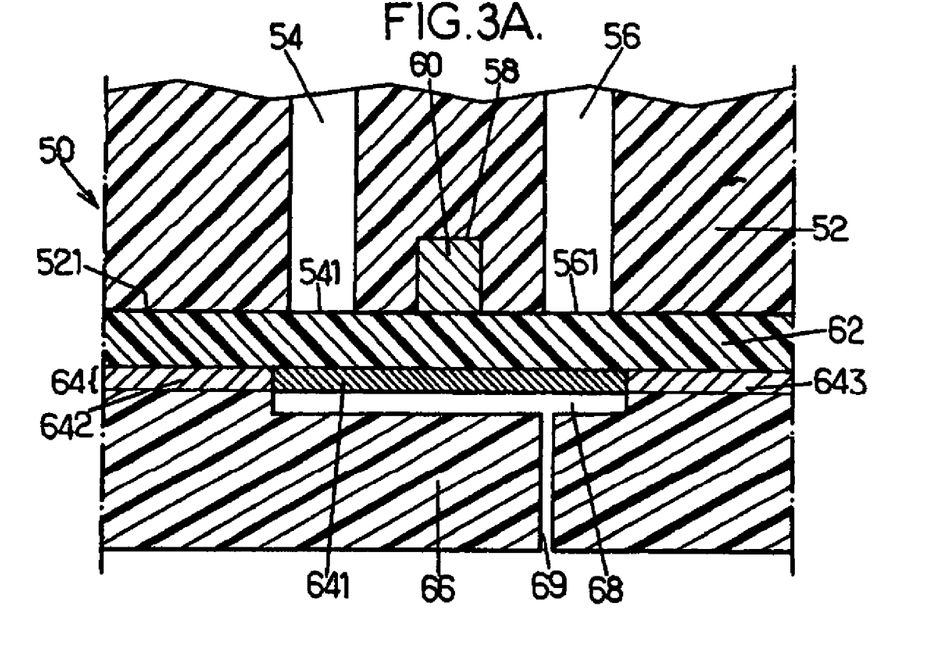
FIGS. 3A and 3B show longitudinal axial sectional views of a microfluidic valve according to a third embodiment, in the closed position and open position respectively, in which the heat-sensitive material is a heat-expandable material.

FIG. 3A shows a third embodiment of the openable microfluidic valve according to the invention. The microfluidic valve 50 in this third embodiment has a structure similar to those described in the case of the first and second embodiments. It comprises a plane support 52 of a similar construction to those described above. This support includes an afferent microchannel 54 and an efferent microchannel 56, the ends 541 and 561 of which are flush with the internal surface 521 of the support 52. It further includes a well 58 produced between the two microchannels. This well 58 is produced at the same time as the microchannels 54 and 56 during fabrication of the support 52. For example, it may have a circular cross section with a diameter smaller than the diameter of the cross section of the microchannels. This well 58 is filled with a deposit 60 of a heat-sensitive material having a high expansion coefficient. Such a material may be a polymer, a resin, a gum, a wax or microspheres containing a hydrocarbon, such as isopropane or isobutane, which may or may not be mixed with a polymer matrix or a gel (Expancel® microspheres from Expancel).

The microfluidic valve 50 further includes a layer 62 of a polymer material. This material is advantageously a heat-sensitive material and is of the type of that used in the second embodiment described above. This layer 62 is bonded to the support 52 by any suitable means, such as adhesive bonding, hot-press heat sealing, or any other equivalent process, in such a way that it closes off the ends 541 and 561 of the microchannels 54 and 56. When the layer 62 is bonded to the support 52 by adhesive bonding or heat sealing, a deposit of hot-melt adhesive may advantageously be placed on the upper face of the layer 62 so as to improve the bonding.

A conducting track 64 is deposited on the lower face of the layer 62. As in the first and second embodiments of the microfluidic valve according to the invention, this conducting track is produced by screenprinting or lithography. It includes a preferential heating zone 641 bounded by the conducting zones 642 and 643, similar to those described above.

Finally, the microfluidic valve includes a lower layer 66 of polymer material, of similar structure to that of the layers 22 and 38 described in the first and second embodiments. The layer 66 further includes, on its internal face 661, a recess 68 placed approximately in such a way that, when the layer 66 is bonded to the layer 62, the recess 68 and the heating zone 641 are in superposition. Finally, a vent 69 is provided in the layer 66, perpendicular to the recess 68, allowing the latter to communicate with the outside of the microfluidic valve.

Figure 3B:
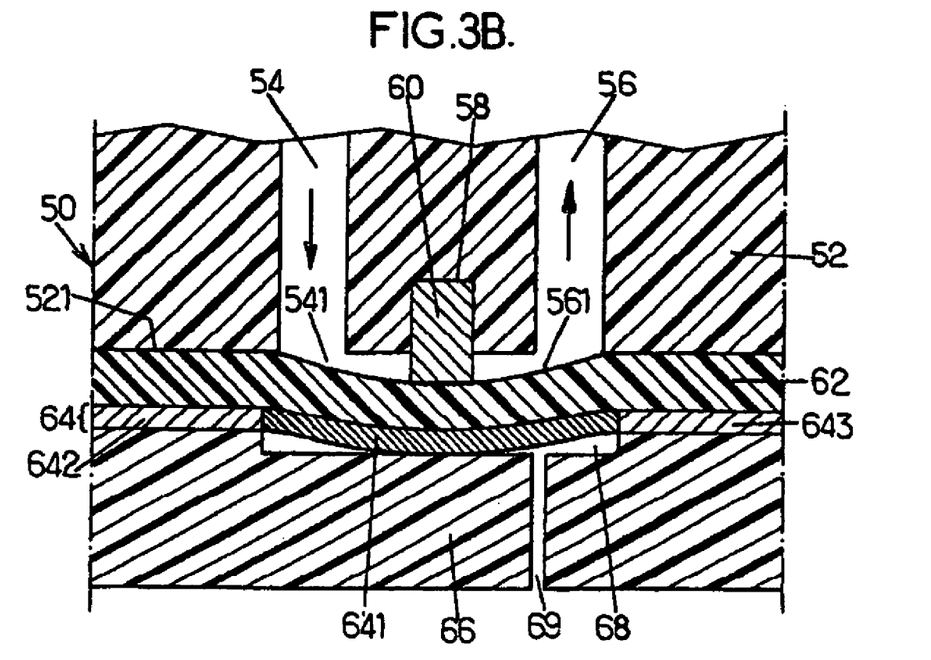

To understand the operation of the openable microfluidic valve 50, the reader may refer to FIGS. 3A and 3B. A voltage is applied to the track 64, this voltage causing the temperature to increase in the heating zone 641. This increase in temperature causes the heat-sensitive material 60 to expand in the longitudinal direction. The expanded material 60 presses on the layer 62 and causes deformation and debonding of the latter in a zone lying between the ends 541 and 561 of the microchannels 54 and 56. The debonding is accentuated by the presence of the recess 68, which acts as a niche and receives that portion of the layer 62 which has been deformed by the material 60. The layer 62 then presses on the air contained in the recess 68. This air is then evacuated via the vent 69. Communication between the microchannels 54 and 56 is thus established and allows the flow initially trapped in the microchannel 54 to flow into the microchannel 56, along the direction of the arrows shown in FIG. 3B. Since the cross section of the material 60 is limited, once communication has been established between the microchannels 54 and 56 the flow of fluid takes place horizontally on either side of the material, the latter in no way impeding the flow of the fluid.

A variant of this third embodiment may consist in trapping in the well 58 a liquid or a gel instead of the heat-expandable material. The liquid/gel must be endowed with the ability to change from the liquid state into a gas when it is subjected to a defined amount of heat. Advantageously, such a liquid may be a hydrocarbon of the isobutane or isopropane type, or Freon. Other fluids that can be used, by themselves or as a mixture, are CFCs or equivalent. Thus, it may be advantageous to use the refrigerant R11, the thermodynamic properties of which are given in the table below.

| T (° C.) | ρ (kg/m³) | ρ$_L$ (kg/m³) | p$_v$ (bar) | L (kJ/kg) | k$_L$ (W/m/K) |
|---|---|---|---|---|---|
| 7 | 3.2 | 1518 | 0.54 | 188 | 0.093 |
| 27 | 6.5 | 1471 | 1.134 | 181 | 0.087 |
| 47 | 11.8 | 1420 | 2.16 | 173 | 0.081 |
| 67 | 20 | 1371 | 3.76 | 164 | 0.076 |

The liquid/gel is kept trapped in the well 60 by means of the layer 62 which seals it off. When a current flows in the conducting track and causes the zone 641 to heat up, the increase in temperature in this zone causes the liquid contained in the well 60 to change state. The gas then exerts a substantial pressure on the layer 62, causing it to deform and debond, the debonded portion occupying the recess 68 in the layer 66 provided for this purpose.

In the case of this variant, it may be advantageous to provide a vent in the support 52, in the form of a duct connected to the microchannel 56 and allowing the gas produced to be evacuated so that it does not oppose the flow of fluid between the microchannel 54 and the microchannel 56.

Figure 4A:
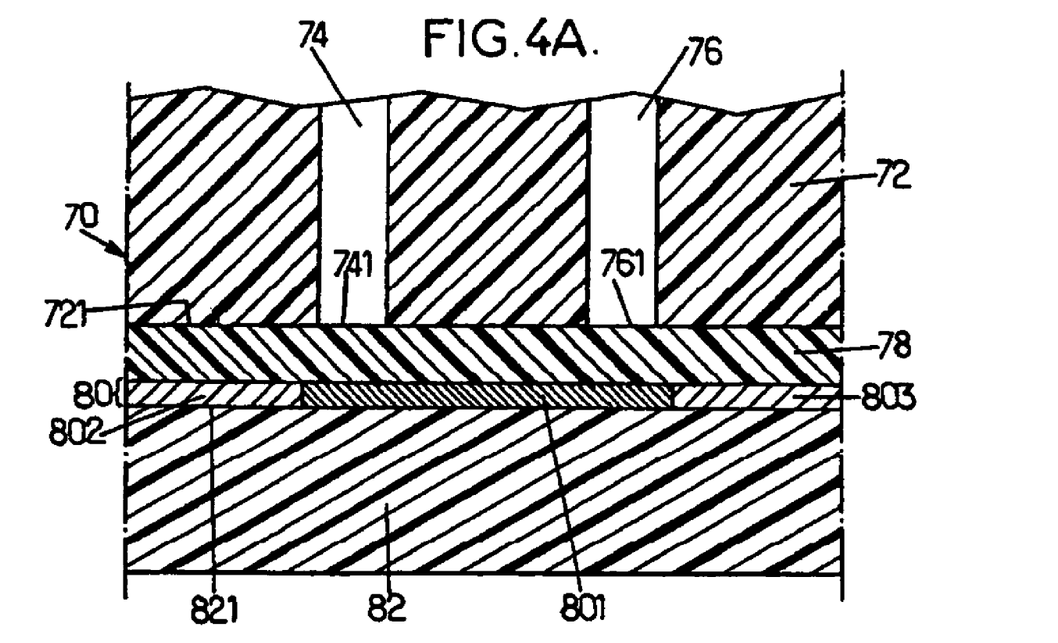
FIGS. 4A and 4B show longitudinal axial sectional views of a microfluidic valve according to a fourth embodiment, in the closed position and open position respectively, in which the heat-sensitive material is a heat-shrinkable material.
Figure 4B:
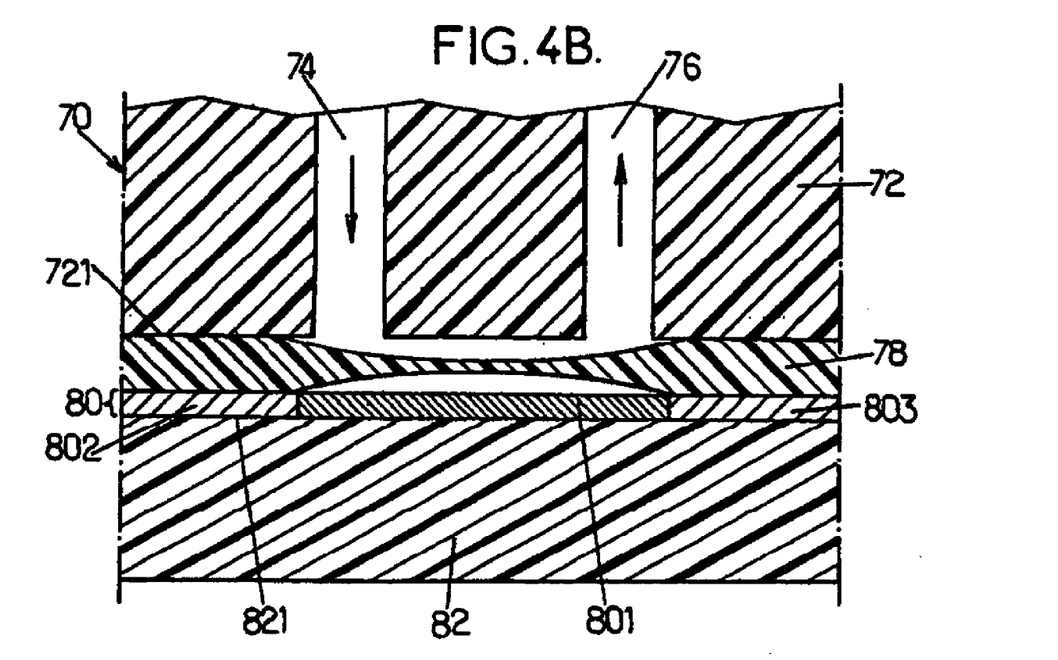

A fourth embodiment of the openable microfluidic valve according to the invention is based on the use of a pyrotechnic composition. Such a microfluidic valve is shown in FIGS. 4A and 4B. This microfluidic valve 70 comprises a support 72, similar to the supports 12, 32 and 52 described in the previous embodiments. This support 72 includes an afferent microchannel 74 and an efferent microchannel 76, the ends 741 and 761 of which are flush with the internal surface 721 of the support 72.

The support 72 is in contact with a layer 78 of a heat-sensitive material. This heat-sensitive material is in this case a heat-shrinkable material. This layer 78 is in the form of a film bonded, laminated or overmolded onto the surface of the support 72. The layer 78 therefore closes off the ends 741 and 761 of the microchannels 74 and 76.

As in the embodiments described above, the microfluidic valve includes a conducting track 80 having a preferential heating zone 801 bounded by two conducting zones 802 and 803. Advantageously, the conducting track is produced on the internal face 821 of the polymer layer 82, equivalent to the layers 22, 38 and 66.

The microfluidic valve 70 opens as follows. Voltage is applied to the conducting track 80, the heating zone 801 increases in temperature until reaching the temperature at which the material constituting the layer 78 shrinks. It therefore follows that this material will shrink in its part lying opposite the heating zone 801, thus freeing the ends 741 and 761 of the microchannels 74 and 76. Fluid flow from the microchannel 74 into the microchannel 76 is then reestablished.

An advantageous variant of this fourth embodiment consists in placing the conducting track 80 in contact with the support 70, between the ends 741 and 761 of the microchannels 74 and 76, so as to be able to optimize the shrinking of the material constituting the layer 78 between the two channels 74 and 76.

Figure 5A:
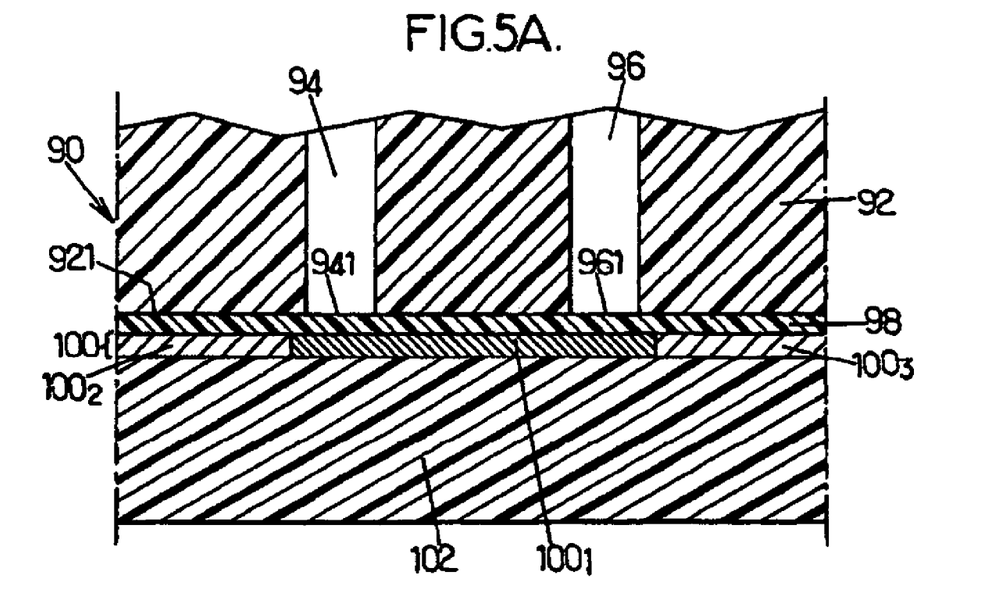
FIGS. 5A and 5B show longitudinal axial sectional views of a microfluidic valve according to a fifth embodiment in the closed position and open position respectively, in which the heat-sensitive material is a pyrotechnic material.
Figure 5B:
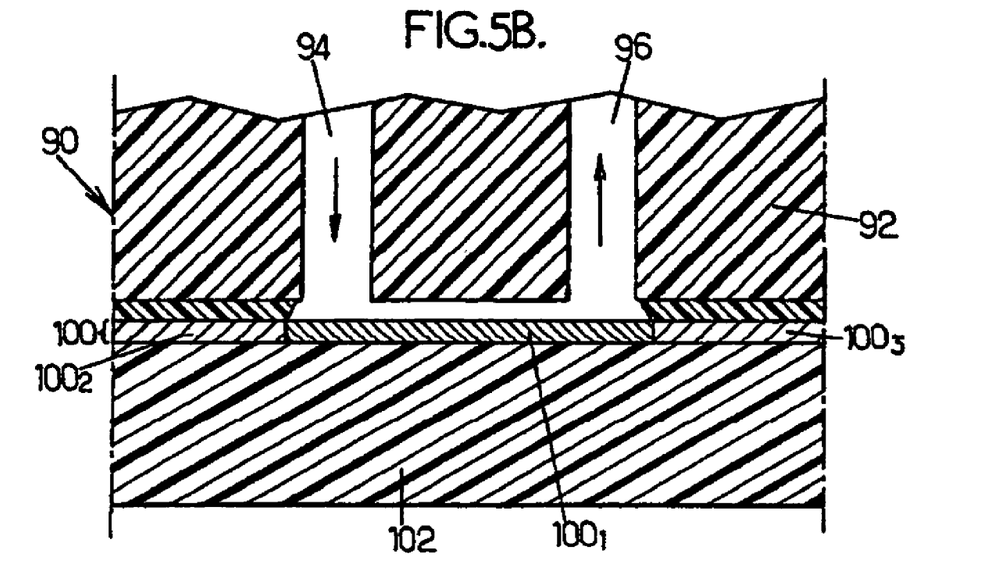

A fifth embodiment of the openable microfluidic valve according to the invention is based on the use of a pyrotechnic composition. Such a microfluidic valve is shown in FIGS. 5A and 5B. This microfluidic valve 90 comprises a support 92 similar to the supports 12, 32, 52 and 72 described in the previous embodiments. This support 92 includes an afferent microchannel 94 and an efferent microchannel 96, the ends 941 and 961 of which are flush with the internal surface 921 of the support 92.

Deposited on the internal face 921 of the support 92 is a layer 98 of a pyrotechnic composition, preferably in the form of a varnish. This pyrotechnic composition may for example be based on nitrocellulose.

In the embodiment illustrated in FIGS. 5A and 5B, the layer 98 is deposited uniformly over the entire surface of the support by screenprinting, spraying, dispensing of droplets, or pressure-pad printing in a limited zone lying between the two ends of the microchannels.

A conducting track 100 is produced as described above. This track includes a preferential heating zone 101$_1$ bounded by two conducting zones 100$_2$ and 100$_3$.

In a variant of this embodiment, the conducting track 100 may be deposited on the internal face 921 of the support 92 prior to the layer of pyrotechnic composition.

Finally, a polymer layer 102 similar to the layers 22, 38, 66 and 82 described above is bonded to the support 92. The layer of pyrotechnic composition may advantageously act as adhesive in order for the microchannels 94 and 96 to be better sealed off. After the layer of pyrotechnic composition has been deposited on the internal face 721 of the support 72, the polymer layer 102 bearing the conducting track 100 may be assembled by adhesive bonding (hot pressing or double-sided adhesive tape).

The method of operating the openable microfluidic valve 90 is as follows. An electric current is delivered into the conducting track 100, causing the temperature to increase in the heating zone 100$_1$ until it reaches the temperature for initiating the pyrotechnic composition. As shown in FIG. 5B, the combustion of the pyrotechnic composition frees the end 941 and 961 of the microchannels 94 and 96, thereby establishing fluid communication between these microchannels and causing the fluid to flow in the direction of the arrows.

In a variant of this embodiment, it may be advantageous to provide a vent in the support 92 linked to the microchannel 96, in the form of a duct for discharging the gases produced during combustion of the pyrotechnic composition, so that these gases do not oppose the flow of fluid between the microchannel 94 and the microchannel 96.

The openable microfluidic valves according to the invention are intended to be used in Microsystems including microfluidic circuits. The multilayer microstructure of these microfluidic valves is particularly suitable for being integrated into a microsystem in an industrial process. Microfluidic systems, such as analysis cards in the biomedical field, are generally made up of a multilayer structure. The fabrication of the microfluidic valve according to the invention can therefore be completely integrated into the fabrication of the microsystem, with a very limited number of additional steps specific to the design of the microfluidic valve, most of the constituent layers of the microfluidic valve, especially the support (12, 32, 52, 72), the polymer layer (18, 38, 62) and the lower layer (22, 42, 66 and 82) being constituents of the microsystem.

Another advantage of this microsystem is that it allows the production of a large number of microfluidic valves in a very confined space, in series or in parallel with the microfluidic circuit, it being possible for the microfluidic valves to be very close to one another. The microlayer structure allows several microfluidic valves to be produced simultaneously by wafer-scale deposition of films, by controlled industrial processes known to those skilled in the art, for producing the layers.

A final advantage of the microfluidic valve according to the invention is its very good sealing characteristics. This is because the quality of the microfluidic valve sealing is provided by sealing it off by known closure film means (lamination, deposition of a film with a hot-melt adhesive, etc.). It is unnecessary to deposit material on the ends of the microchannels where the valves have to be placed (long cycle time, deposition error, defect occurring when the meltable product solidifies, possibly resulting in a leak, etc.). Within the context of the invention, the films are deposited by wafer-scale deposition in an industrial manner by conventional processes. This allows very great robustness in valve closure to be obtained.

The invention claimed is:

1. An electrically openable microfluidic valve, characterized in that it comprises:
    at least one plane support;
    at least one afferent microchannel;
    at least one efferent microchannel;
    said microchannels being provided in the support, so that at least one of their ends and opens onto the internal face of said support, near one another;
    at least one deposit of a heat-sensitive material laid out on the internal face of the support; and
    at least one heating means;
    so that the deposit of heat-sensitive material at least partly closes off the space separating the ends and of the microchannels and, thus preventing the latter from communicating with one another;
    the increase in temperature by the heating means resulting in a modification of the structure of the heat-sensitive material, thus at least partially clearing the ends of the microchannels and the space between the latter, so as to allow communication between said microchannels and to restore flow of the fluid.

2. The microfluidic valve as claimed in claim 1, characterized in that it further includes at least one coating layer bonded to the support.

3. The microfluidic valve as claimed in claim 2, characterized in that the coating layer includes a recess lying in the extension of the ends and of the microchannels and.

4. The microfluidic valve as claimed in claim 1, characterized in that the heat-sensitive material is a thermofusible material.

5. The microfluidic valve as claimed in claim 4, characterized in that the thermoplastic material is taken from the group comprising thermofusible polymers and thermofusible or hot-melt adhesives.

6. The microfluidic valve as claimed in claim 1, characterized in that the heat-sensitive material is a heat-expandable material.

7. The microfluidic valve as claimed in claim 6, characterized in that the heat-expandable material is deposited in a well made on the internal face of the support.

8. The microfluidic valve as claimed in claim 1, characterized in that the heat-sensitive material is a heat-shrinkable material.

9. The microfluidic valve as claimed in claim 1, characterized in that the heat-sensitive material is a pyrotechnic composition.

10. The microfluidic valve as claimed in claim 9, characterized in that the pyrotechnic composition is a nitrocellulose-based composition.

11. The microfluidic valve as claimed in claim 1, characterized in that the heating means comprises at least one conducting track, having conducting zones, and at least one preferential heating zone, optionally at least partly in contact with the deposit of heat-sensitive material.

12. The microfluidic valve as claimed in claim 11, characterized in that the increase in temperature of the preferential heating zone is obtained by applying an electric current to the conducting track.

13. The microfluidic valve as claimed in claim 11, characterized in that the preferential heating zone is formed by a deposit of a resistive material.

14. The microfluidic valve as claimed in claim 11, characterized in that the preferential heating zone is a heating zone of restricted cross section of the conducting track.

15. The microfluidic valve as claimed in claim 1, characterized in that it further includes a gas evacuation means.

16. A process for fabricating a microfluidic valve as claimed in claim 1, characterized in that it comprises the following steps:
    a) fabrication of the plane support, which includes at least one afferent microchannel and at least one efferent microchannel;
    b) deposition of the heat-sensitive material by bonding a film to the internal face of the support so as to close off the ends and of said microchannels and; and
    c) deposition of at least one conducting track, which includes at least one preferential heating zone at least partly on said deposit of heat-sensitive material,
    it being possible for steps b) and c) to be reversed.

17. The process as claimed in claim 16, characterized in that it further includes a step of depositing a coating layer by bonding a film to the plane support.

18. The process as claimed in claim 16, characterized in that the films constituting the deposit of heat-sensitive material and the coating layer are bonded to the plane support by hot or cold lamination, or by bonding using a hot-melt adhesive.

19. The process as claimed in claim 16, characterized in that the conducting track is deposited:
    by photoetching of the conducting zones and screenprinting or pressure-pad printing of the preferential heating zone; or
    by photolithography of the conducting zones and of the preferential heating zone.

20. A microsystem, comprising:
    at least one microfluidic valve produced by the process of claim 16.

21. A microsystem, comprising:
    at least one microfluidic valve, each microfluidic valve including the microfluidic valve of claim 1.

22. A method of opening a microfluidic valve as claimed in claim 1, characterized in that it comprises the following steps:
    application of an electric current in at least one conducting track having a preferential heating zone;
    increase in the temperature of the preferential heating zone;
    modification of the structure of the heat-sensitive material in contact with the preferential heating zone;
    at least partial clearing of the ends of the microchannels and of the space between the latter, so as to establish communication between said microchannels; and
    restoration of the fluid flow.

* * * * *

UNITED STATES PATENT AND TRADEMARK OFFICE
CERTIFICATE OF CORRECTION

PATENT NO.         : 7,159,618 B2                                      Page 1 of 1
APPLICATION NO. : 10/559454
DATED              : January 9, 2007
INVENTOR(S)        : Patrick Broyer, Bruno Colin and Denis Roller It is certified that error appears in the above-identified patent and that said Letters Patent is hereby corrected as shown below:

On the Title page of the patent, at item (30) Foreign Application Priority Data, change the priority number from "03 077222" to --03 07222--.

Signed and Sealed this

Twenty-seventh Day of March, 2007

JON W. DUDAS
*Director of the United States Patent and Trademark Office*